E. E. FLORA.
STRAP TIGHTENING IMPLEMENT.
APPLICATION FILED AUG. 17, 1914.
1,149,569.
Patented Aug. 10, 1915.
2 SHEETS—SHEET 1.
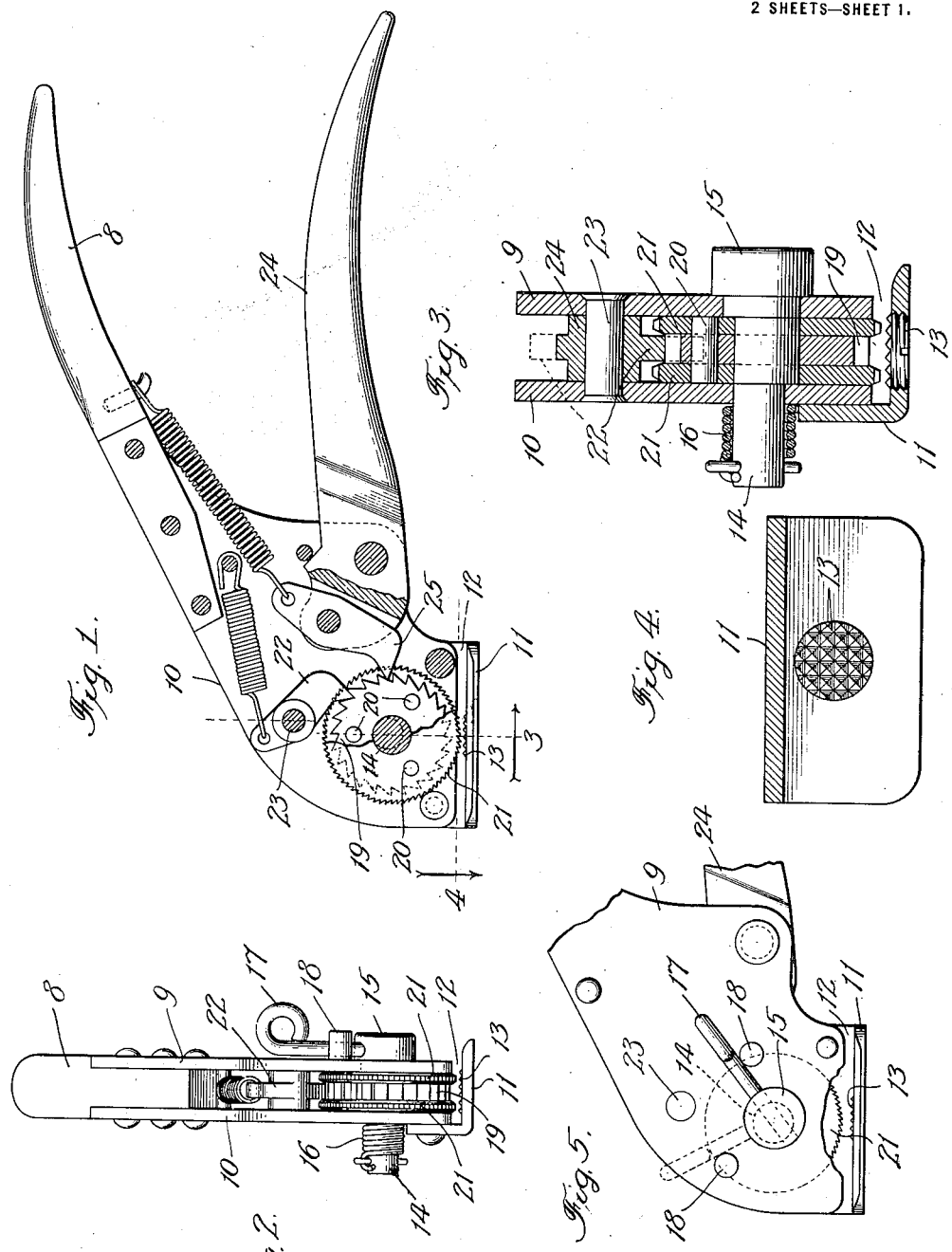
Witnesses:
Chas. H. Buell
Irwin C. Bowman
Inventor:
Ellsworth E. Flora,
By Dyrenforth, Lee, Chritton and Wiles,
Attys.

E. E. FLORA.
STRAP TIGHTENING IMPLEMENT.
APPLICATION FILED AUG. 17, 1914.
1,149,569.
Patented Aug. 10, 1915.
2 SHEETS—SHEET 2.
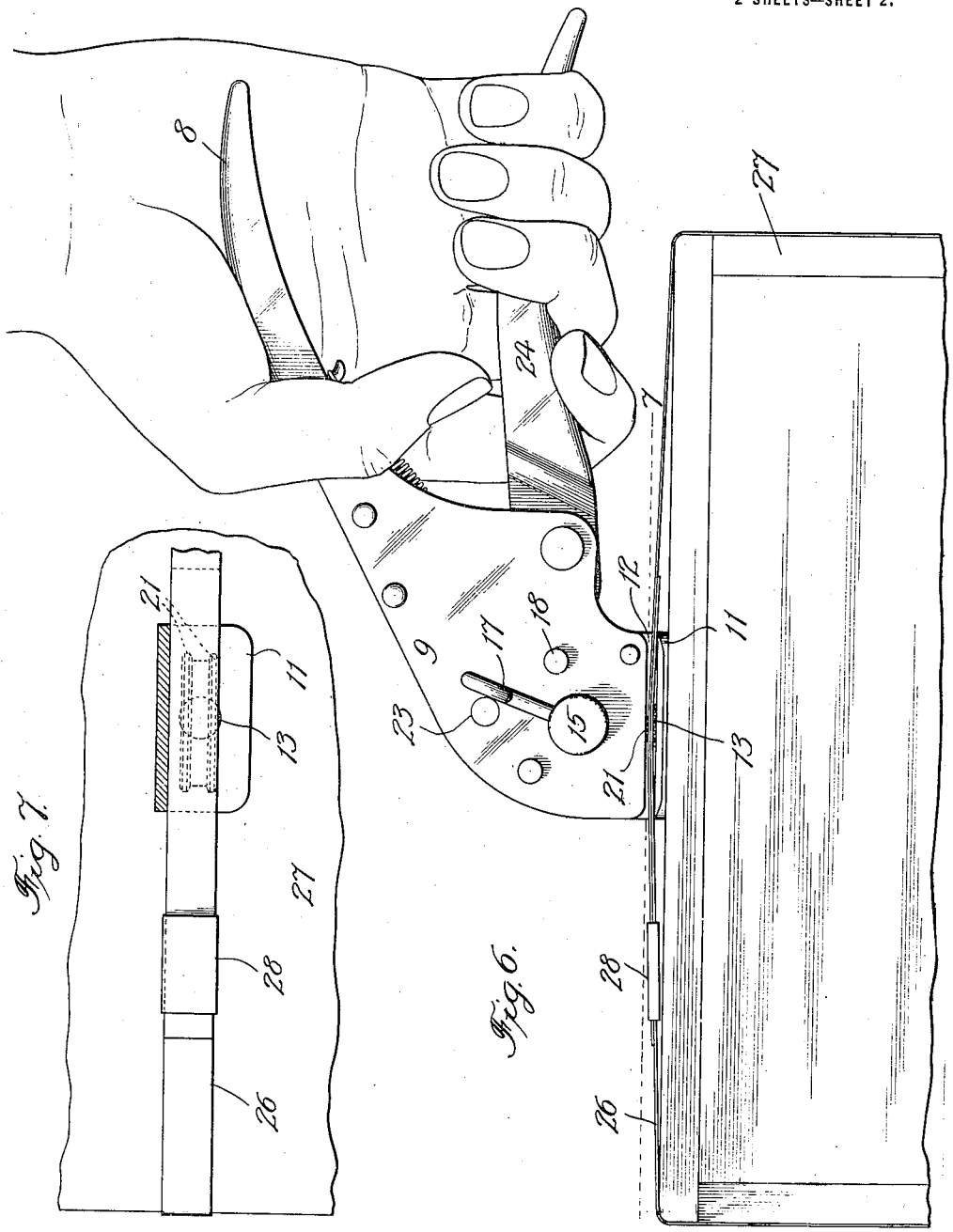

UNITED STATES PATENT OFFICE.

ELLSWORTH E. FLORA, OF CHICAGO, ILLINOIS, ASSIGNOR TO THE SEAL & FASTENER CO., OF CHICAGO, ILLINOIS, A CORPORATION OF DELAWARE.

STRAP-TIGHTENING IMPLEMENT.

1,149,569.

Specification of Letters Patent. Patented Aug. 10, 1915.

Application filed August 17, 1914. Serial No. 857,123.

*To all whom it may concern:*

Be it known that I, ELLSWORTH E. FLORA, a citizen of the United States, residing at Chicago, in the county of Cook and State of Illinois, have invented a new and useful Improvement in Strap-Tightening Implements, of which the following is a specification.

In applying metal straps about packages (boxes, bales, bundles, barrels, and the like) they should, for safety and neatness of appearance of the packages, be pulled taut before fastening them in place by nailing, joining their mutually overlapping ends, or other manner of securing.

I have devised an improved implement for the aforesaid purpose, and it is illustrated in its preferred embodiment in the accompanying drawings, in which—

Figure 1 is a partly broken view in side elevation of my improved implement with one side-plate or cheek and the thumb-piece thereat removed; Fig. 2 is a view of the same in front-end elevation; Fig. 3 is an enlarged section on line 3, Fig. 1; Fig. 4 is an enlarged section on line 4, Fig. 1; Fig. 5 is a broken view, enlarged over the scale observed in Fig. 1, showing the head-portion of the implement in side elevation; Fig. 6 is a view illustrating the practical operation of the implement on a box being strapped, and Fig. 7 is a broken view in section on line 7—7, Fig. 6.

The implement is shown as a tool to be held for operating it in a hand of the user, though it is to be understood that it may be of larger proportions to be operated by both hands or by other than hand power. A relatively stationary member comprises a handle 8 having parallel cheeks 9 and 10 rigidly fastened, as by riveting, to its opposite sides and also secured together and held apart at different other points by rivets, thus forming a head. On the lower edge of the cheek 10 is fastened a rectangular lip 11 extending under the corresponding edge of the cheek 9, with which it forms an interposed insertion-space 12. The inner surface of the lip is roughened, as by providing centrally in it a disk 13 having its operating face profusely serrated, as shown. A crank-shaft 14 is journaled in the cheeks, being held in place by a head 15 on one end and an adequately stiff spring 16 coiled about its opposite projecting end; and from this shaft-head extends a thumb-piece 17, or handle, for turning the shaft, movable between stops 18, 18 on the cheek 9. On the eccentric section of the shaft is loosely supported a ratchet 19 having pins 20 projecting transversely through it at intervals near its edge. Similar friction-wheels 21, shown to be finely serrated about their peripheries and of greater diameter than the ratchet, are supported at opposite sides of the latter on the crank-section of the shaft, and are caused to turn with the ratchet by the pins 20 extending through holes provided in them and by being confined between the cheeks and the faces of the ratchet opposing them. A spring-pressed detent 22 is pivotally supported between the cheeks at 23 to engage the ratchet. A handle 24 is pivotally supported between the cheeks and carries pivotally on its inner end a spring-pressed pawl 25 engaging the ratchet-wheel to turn it by working the handle 24.

To employ the tool for tightening a metal strap 26, say about a box represented at 27, with the strap bent around the box the ends are brought into lengthwise mutually overlapping relation. The operator presses downwardly the thumb-piece to turn the shaft 14 and thereby raise the wheels 21 from obstructing entrance into the space 12, and he then introduces the lip 11 underneath the overlapping strap-ends, or work, whereupon he frees the thumb-piece to permit the spring 16 to return the shaft to its normal position and thereby bear the friction-wheels against the adjacent surface of a strap-end. This presses the opposite surface of the nether strap-end against the roughened surface 13 to hold it against slipping. By then working the handle 24, the pawl turns the ratchet to turn the friction wheels against the strap-end they engage to advance it and thereby pull the strap taut; and while the strap is in that condition it may be fastened by nailing or in any other desired manner.

I have more immediately devised the present tool for coöperative use with the tool of Letters Patent No. 1,038,109, granted to me September 10, 1912, in practising my invention set forth in Letters Patent of that date numbered 1,038,108. Hence the illustration in Figs. 6 and 7 showing about the mutually overlapping strap-ends a metal sleeve 28 to be clenched, after the described tautening of the strap, by the tool of the first-named patent according to the invention of the last-named patent.

I realize that considerable variation is possible in the details of construction thus specifically shown and described, and I do not intend by illustrating a single specific or preferred embodiment of my invention to be limited thereto; my intention being in the following claims to claim protection upon all the novelty there may be in my invention as broadly as the state of the art will permit.

What I claim as new and desire to secure by Letters Patent is—

1. In an implement of the character described, the combination of a head provided with a handle, a lip on the head forming with the latter an entrance-slot for the work, means in the head for frictionally and movably engaging the work, a handle movably supported on the head, and connections between the movable handle and said means for actuating the latter.

2. In an implement of the character described, the combination of a head provided with a handle, a lip on the head forming with the latter an entrance-slot for the work, a shaft journaled in the head and carrying in the latter a ratchet and a friction-wheel, and a handle pivotally supported on the head and carrying a spring-pressed pawl engaging the ratchet.

3. In an implement of the character described, the combination of a head provided with a handle, a lip on the head forming with the latter an entrance-slot for the work and having a roughened surface, a crankshaft journaled in the head and carrying on its crank portion a ratchet and a friction wheel normally obstructing entrance into said slot, means on the shaft for turning it to remove the friction wheel from said obstructing position, and a handle pivotally supported on the head and carrying a spring-pressed pawl engaging the ratchet.

4. In an implement of the character described, the combination of a head provided with a handle, a lip on the head forming an entrance-slot for the work and having a roughened surface, a spring-pressed crankshaft journaled in the head and carrying on one end a thumb-piece and on its crank portion in the head a detent-held ratchet and a friction-wheel normally obstructing entrance into said slot, and a handle pivotally supported on the head and carrying a spring-pressed pawl engaging the ratchet.

5. An implement of the character described, comprising a head formed of a pair of cheeks and provided with a handle, a lip extending from one cheek across the other and forming with the latter an entrance space for the work, said lip having a roughened inner surface, a spring-retracted crankshaft journaled in the cheeks and provided on one end with a thumb-piece, a pair of toothed wheels and a detent-held ratchet between and connected with said wheels, rotatably supported on the crank portion of said shaft, a handle pivotally supported on the head to extend between said cheeks, and a spring-retracted pawl pivotally supported on said last-named handle to engage and actuate the ratchet.

ELLSWORTH E. FLORA.

In presence of—
D. C. THORSEN.
A. C. FISCHER,